US012749198B2

(12) United States Patent
Feng et al.

(10) Patent No.: US 12,749,198 B2
(45) Date of Patent: Sep. 29, 2026

(54) SYSTEMS FOR DETERMINING IMAGE MASKS USING MULTIPLE INPUT IMAGES

(71) Applicant: AMAZON TECHNOLOGIES, INC., Seattle, WA (US)

(72) Inventors: Qianli Feng, Seattle, WA (US); Raghu Deep Gadde, Bothell, WA (US); Aleix Margarit Martinez, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 608 days.

(21) Appl. No.: 18/193,039

(22) Filed: Mar. 30, 2023

(65) Prior Publication Data

US 2024/0331163 A1 Oct. 3, 2024

(51) Int. Cl.

| | |
|---|---|
| ***G06T 7/12*** | (2017.01) |
| ***G06T 7/50*** | (2017.01) |
| ***G06T 7/70*** | (2017.01) |
| ***G06T 7/90*** | (2017.01) |
| ***G06V 10/25*** | (2022.01) |
| ***G06V 10/56*** | (2022.01) |
| ***G06V 10/762*** | (2022.01) |
| ***G06V 10/82*** | (2022.01) |

(52) U.S. Cl.

CPC .................. *G06T 7/12* (2017.01); *G06T 7/50* (2017.01); *G06T 7/70* (2017.01); *G06T 7/90* (2017.01); *G06V 10/25* (2022.01); *G06V 10/56* (2022.01); *G06V 10/762* (2022.01); *G06V 10/82* (2022.01); *G06T 2207/10024* (2013.01)

(58) Field of Classification Search

CPC ..... G06T 7/11; G06T 7/12; G06T 7/90; G06T 7/70

See application file for complete search history.

(56) References Cited

U.S. PATENT DOCUMENTS

| | | | | |
|---|---|---|---|---|
| 10,672,141 | B2 * | 6/2020 | Motohashi | G06V 20/56 |
| 10,776,663 | B1 | 9/2020 | Bogdanovych et al. | |
| 11,276,177 | B1 * | 3/2022 | Tsai | G06T 7/174 |

(Continued)

OTHER PUBLICATIONS

Karras, T., Laine, S., & Aila, T. (2019). A style-based generator architecture for generative adversarial networks. In Proceedings of the IEEE/CVF conference on computer vision and pattern recognition (pp. 4401-4410) (Year: 2019).*

(Continued)

*Primary Examiner* — Vu Le
*Assistant Examiner* — Jack Peter Kraynak
(74) *Attorney, Agent, or Firm* — Pierce Atwood LLP

(57) ABSTRACT

To identify sets of pixels in a first image that correspond to different objects or a background, a first image is provided to a Generative Adversarial Network (GAN). The GAN determines alternate images that retain the structural characteristics of the first image, such as the locations and shapes of objects, while modifying style characteristics, such as the colors of pixels. The images generated by the GAN may then be analyzed, such as by using a k-means clustering algorithm, to determine sets of pixels at the same location that change color in a similar manner across the set of images. A set of pixels that changes in a similar manner across the images generated by the GAN may be used as a mask representing an object or background to enable modification of the image without interfering with other objects.

20 Claims, 5 Drawing Sheets

(56) References Cited

U.S. PATENT DOCUMENTS

| | | | | |
|---|---|---|---|---|
| 2018/0068463 | A1* | 3/2018 | Risser | G06T 11/10 |
| 2021/0042571 | A1* | 2/2021 | Shiraishi | G06F 18/217 |
| 2021/0256707 | A1* | 8/2021 | Brown | G06N 3/084 |
| 2022/0083807 | A1* | 3/2022 | Zhang | G06F 18/2431 |
| 2022/0101047 | A1* | 3/2022 | Puri | G06V 10/26 |
| 2022/0207861 | A1* | 6/2022 | Li | G06V 20/70 |
| 2024/0104936 | A1* | 3/2024 | Tsuchiya | G06T 3/4053 |
| 2025/0005729 | A1* | 1/2025 | Prokes | G06T 7/0002 |

OTHER PUBLICATIONS

Chen, M., Artières, T., & Denoyer, L. (2019). Unsupervised object segmentation by redrawing. Advances in neural information processing systems, 32 (Year: 2019).*

Ji, X., Henriques, J. F., & Vedaldi, A. (2019). Invariant information clustering for unsupervised image classification and segmentation. In Proceedings of the IEEE/CVF international conference on computer vision (pp. 9865-9874) (Year: 2019).*

Choi, Yunjey, et al. "Stargan v2: Diverse image synthesis for multiple domains." Proceedings of the IEEE/CVF conference on computer vision and pattern recognition. 2020 (Year: 2020).*

Dosovitskiy, A., Beyer, L., Kolesnikov, A., Weissenborn, D., Zhai, X., Unterthiner, T., . . . & Houlsby, N. (2020). An image is worth 16x16 words: Transformers for image recognition at scale. arXiv preprint arXiv:2010.11929 (Year: 2020).*

Zhang, Y., Ling, H., Gao, J., Yin, K., Lafleche, J. F., Barriuso, A., . . . & Fidler, S. (2021). Datasetgan: Efficient labeled data factory with minimal human effort. In Proceedings of the IEEE/CVF Conference on Computer Vision and Pattern Recognition (pp. 10145-10155). (Year: 2021).*

E. Collins, R. Bala, B. Price and S. Süsstrunk, "Editing in Style: Uncovering the Local Semantics of GANs," 2020 IEEE/CVF Conference on Computer Vision and Pattern Recognition (CVPR), Seattle, WA, USA, 2020, pp. 5770-5779, doi: 10.1109/CVPR42600.2020.00581 (Year: 2020).*

Chen et al., "Unsupervised Object Segmentation by Redrawing", 33rd Conference on Neural Information Processing Systems (NeurIPS 2019), Vancouver, Canada, Nov. 29, 2019.

Dai et al. "BoxSup: Exploiting Bounding Boxes to Supervise Convolutional Networks for Semantic Segmentation",2015 IEEE International Conference on Computer Vision (ICCV), IEEE, Dec. 7, 2015, pp. 1635-1643.

Meier, Ueli, "International Search Report and Written Opinion of the International Searching Authority dated Oct. 20, 2023", Patent Application No. PCT/US2023/070957, The European Patent Office, Oct. 20, 2023.

Abdal, et al., "Labels4Free: Unsupervised Segmentation using StyleGAN", Proceedings of the IEEE/CVF International Conference on Computer Vision (ICCV), Mar. 27, 2021, 13 pgs. Retrieved from the Internet: URL: https://arxiv.org/pdf/2103.14968.pdf.

Alaluf, et al., "ReStyle: A Residual-Based StyleGAN Encoder via Iterative Refinement," 2021 IEEE/CVF International Conference on Computer Vision (ICCV), Aug. 24, 2021, 35 pgs. Retrieved from the Internet: URL: https://arxiv.org/pdf/2104.02699.pdf.

Bae, et al., "FurryGAN: High Quality Foreground-Aware Image Synthesis", Computer Vision—ECCV 2022. Aug. 22, 2022, 26 pgs. Retrieved from the Internet: URL: https://arxiv.org/pdf/2208.10422.pdf.

Banitalebi-Dehkordi, et al., "Repaint: Improving the Generalization of Down-Stream Visual Tasks by Generating Multiple Instances of Training Examples", British Machine Vision Conference Oct. 20, 2021, 28 pgs. Retrieved from the Internet: URL: https://arxiv.org/pdf/2110.10366.pdf.

Bielski, et al., "Emergence of Object Segmentation in Perturbed Generative Models", Conference on Advances in Neural Information Processing Systems, NeurIPS 2019, Nov. 2, 2019, 11 pgs. Retrieved from the Internet: URL: https://arxiv.org/pdf/1905.12663.pdf.

Chen, et al., "Encoder-Decoder with Atrous Separable Convolution for Semantic Image Segmentation", Proceedings of the European Conference on Computer Vision (ECCV), Aug. 22, 2018, 18 pgs. Retrieved from the Internet: URL: https://arxiv.org/pdf/1802.02611.pdf.

Choi, et al., "StarGAN v2: Diverse Image Synthesis for Multiple Domains" IEEE/CVF International Conference on Computer Vision and Pattern Recognition, Apr. 26, 2020, 14 pgs. Retrieved from the Internet: URL: https://arxiv.org/pdf/1912.01865.pdf.

Dosovitskiy, et al., "An Image is Worth 16X16 Wrods: Transformers for Image Recognition at Scale", Published as a conference paper at ICLR 2021, Jun. 3, 2021, 22 pgs. Retrieved from the Internet: URL: https://arxiv.org/pdf/2010.11929.pdf.

Gadde, et al., "Detail Me More: Improving GAN's Photo-Realism of Complex Scenes", Proceedings of the IEEE/CVF International Conference on Computer Vision (ICCV), 2021, pp. 13950-13959. Retrieved from the Internet: URL: https://openaccess.thecvf.com/content/ICCV2021/papers/Gadde_Detail_Me_More_Improving_GANs_Photo-Realism_of_Complex_Scenes_ICCV_2.

Johnson, et al., "Billion-Scale Similarity Search with GPUs", IEEE Transactions on Big Data, vol. 7, No. 3, 2017, pp. 535-547. Retrieved from the Internet: URL: https://arxiv.org/pdf/1702.08734.pdf.

Karras, et al., "A Style-Based Generator Architecture for Generative Adversarial Networks", 2019 IEEE/CVF Conference on Computer Vision and Pattern Recognition (CVPR), Mar. 29, 2019, 12 pgs. Retrieved from the Internet: URL: https://www.researchgate.net/publication/4007965_A_Novel_Approach_for_Single_Microphone_Active_Noise_Cancellation.

Kohli, et al., "Robust higher order potentials for enforcing label consistency," 2008 IEEE Conference on Computer Vision and Pattern Recognition, 2008, 43 pgs. Retrieved from the Internet: URL: https://radar.brookes.ac.uk/radar/file/e70ce935-9726-a58f-650e-e4ffae4709d8/1/kohli2009robust.pdf.

Lee, et al., "MaskGAN: Towards Diverse and Interactive Facial Image Manipulation", 2020 IEEE/CVF Conference on Computer Vision and Pattern Recognition (CVPR), Apr. 1, 2020, 20 pgs. Retrieved from the Internet: URL: https://arxiv.org/pdf/1907.11922.pdf.

Li, et al., "BigDatasetGAN: Synthesizing ImageNet with Pixel-wise Annotations", 2022 IEEE/CVF Conference on Computer Vision and Pattern Recognition (CVPR), Jan. 12, 2022, 21 pgs. Retrieved from the Internet: URL: https://arxiv.org/pdf/2201.04684.pdf.

Ling, et al., "EditGAN: High-Precision Semantic Image Editing", Conference on Advances in Neural Information Processing Systems, NeurIPS 2021, Nov. 4, 2021, 38 pgs. Retrieved from the Internet: URL: https://arxiv.org/pdf/2111.03186.pdf.

Liu, et al., "Swin Transformer: Hierarchical Vision Transformer using Shifted Windows", 2021 IEEE/CVF International Conference on Computer Vision (ICCV), Aug. 17, 2021, 14 pgs. Retrieved from the Internet: URL: https://arxiv.org/pdf/2103.14030.pdf.

MMSegmentation Contributors, "OpenMMLab Semantic Segmentation Toolbox and Benchmark", 2020, 7pgs. Retrieved from the Internet: URL: https://github.com/open-mmlab/mmsegmentation.

Pakhomov, et al., "Segmentation in Style: Unsupervised Semantic Image Segmentation with Stylegan and CLIP", Computer Science, Computer Vision and Pattern Recognition, Nov. 18, 2021, 9 pgs. Retrieved from the Internet: URL: https://arxiv.org/pdf/2107.12518.pdf.

Ronneberger, et al., "U-Net: Convolutional Networks for Biomedical Image Segmentation", International Conference on Medical Image Computing and Computer-assisted Intervention, May 18, 2015, 8 pgs. Retrieved from the Internet: URL: https://arxiv.org/pdf/1505.04597.pdf.

Zhai, et al., "LiT : Zero-Shot Transfer with Locked-image text Tuning", 2022 IEEE/CVF Conference on Computer Vision and Pattern Recognition (CVPR), Jun. 22, 2022, 26 pgs. Retrieved from the Internet: URL: https://arxiv.org/pdf/2111.07991.pdf.

Zhang, et al., "DatasetGAN: Efficient Labeled Data Factory with Minimal Human Effort", 2021 IEEE/CVF Conference on Computer Vision and Pattern Recognition (CVPR), Apr. 20, 2021, 11 pgs. Retrieved from the Internet: URL: https://arxiv.org/pdf/2104.06490.pdf.

(56) References Cited

OTHER PUBLICATIONS

Zhang, et al., "GLIPv2: Unifying Localization and VL Understanding", Conference on Advances in Neural Information Processing Systems, NeurIPS 2022, Oct. 11, 2022, 25 pgs. Retrieved from the Internet: URL: https://arxiv.org/pdf/2206.05836.pdf.
Zhou, et al., "Scene parsing through ADE20K dataset",2017 IEEE Conference on Computer Vision and Pattern Recognition (CVPR), Jul. 2017, 10 pgs. Retrieved from the Internet: URL: https://dspace.mit.edu/bitstream/handle/1721.1/124982/scene-parse-camera-ready.pdf?sequence=2.
Meier, Ueli, "International Preliminary Report on Patentability dated Sep. 20, 2025", Patent Application No. PCT/US2023/070957, The European Patent Office, Sep. 20, 2025.

* cited by examiner

SYSTEMS FOR DETERMINING IMAGE MASKS USING MULTIPLE INPUT IMAGES

BACKGROUND

Semantic segmentation is used to determine masks for images, the masks representing the positions and shapes of different objects and a background within an image. Masks may then be used to analyze or modify an image, such as by removing, replacing, or changing content associated with a particular mask without interfering with other objects in the image. Conventional methods for performing semantic segmentation are resource-intensive, requiring significant computational resources, time, and data.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
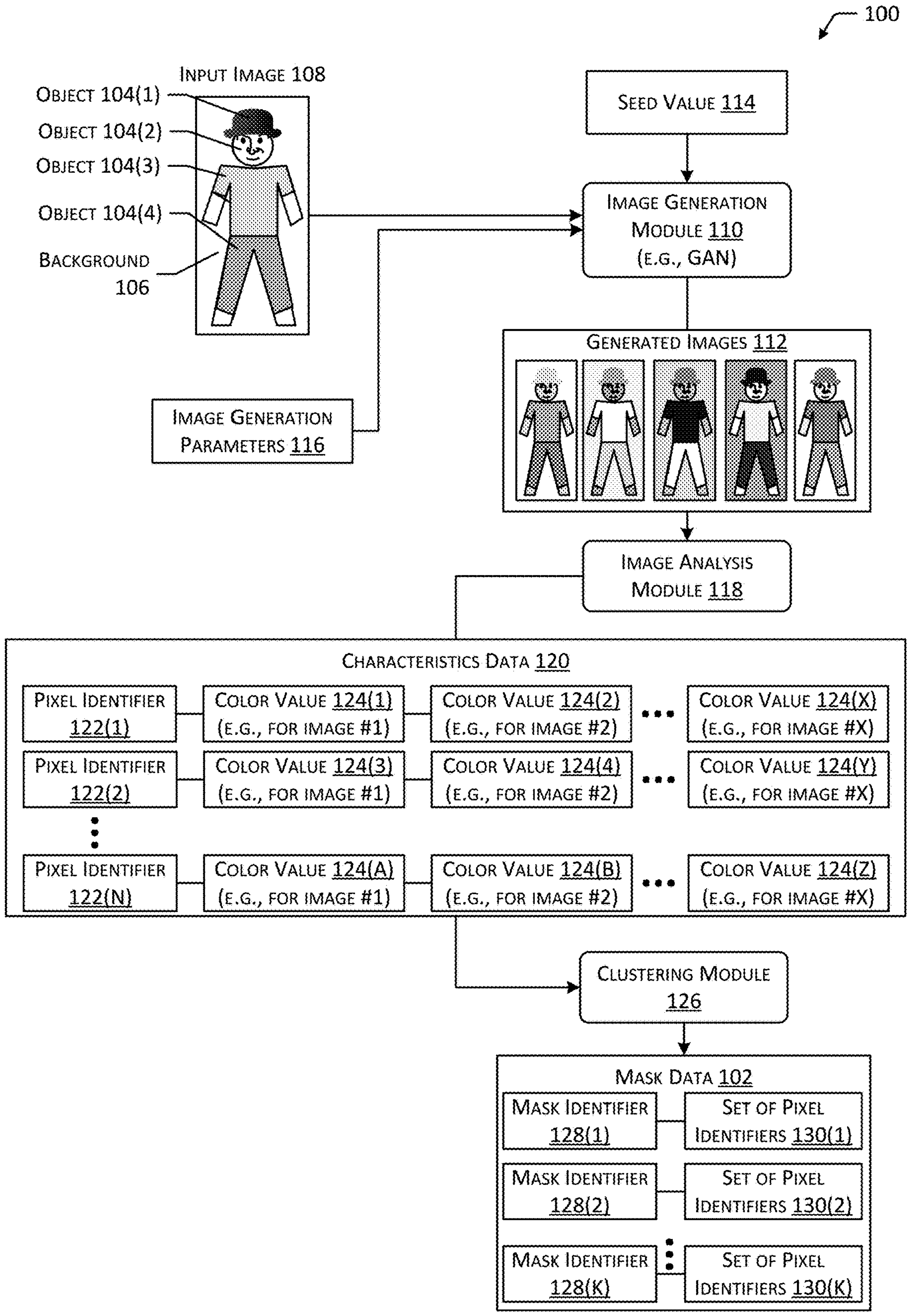
FIG. 1 is a diagram depicting an implementation of a system for determining mask data that represents locations of objects or a background depicted in an input image.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Semantic segmentation is a process by which an image is analyzed to determine masks (e.g., sets of pixels) that correspond to the locations and shapes of objects and a background of the image. The determined masks may then be used for a variety of image analyses or image editing operations. For example, the pixels of an image that correspond to a particular mask may be removed, modified, or replaced with other pixels, and so forth, without interfering with the pixels that correspond to other masks and represent other objects. Example applications of such a process include modifying an image of a human by adding, replacing, or changing a characteristic of clothing, hair, skin, or a background while retaining the human in the image, or modifying an image of a room by adding, replacing, or changing a characteristic of furniture, decorative objects, walls, floors, or ceilings while retaining other objects in the image.

Some conventional methods for performing semantic segmentation use machine learning systems, such as neural networks and computer vision techniques, to analyze the pixels of an image to determine semantic relationships. For example, a group of adjacent pixels having the same or a similar color may be determined to be part of the same object, while an abrupt change in color between adjacent pixels may represent the edge of an object. Use of machine learning systems in this manner requires a significant number of annotated training images for each type of object to be identified. Additionally, these techniques may be subject to inaccuracy when used to analyze complex or cluttered images, or images in which different objects have similar colors or other similar characteristics.

Described in this disclosure are techniques for determining masks that comprise sets of pixels within an image that are associated with the same semantic segments, that use less computational resources than conventional methods and do not require supervised training or use of annotated training data. A first image is processed using a Generative Adversarial Network (GAN) or another type of machine learning system, such as a neural network, deep learning network, convolutional network, transformer network, and so forth to generate a set of second images. The set of images generated by the machine learning system may then be analyzed to determine changes in color or other visual characteristics across the set of images. Sets of pixels that change in a similar manner across the images may be determined to be part of the same semantic segment and included in the same mask, while pixels that change differently relative to one another may be part of different segments that are included in different masks. Mask data is then generated that enables a set of pixels that correspond to a particular object or background (e.g., a mask) to be removed, replaced, or modified without interfering with other sets of pixels in the image that are associated with other objects.

Conceptually, the first image may have a set of structural (e.g., semantic) characteristics, such as the locations and shapes of objects and backgrounds depicted in the first image. The first image may also have a set of style characteristics, such as the color or other visual characteristics of pixels (e.g., luminance, brightness, chrominance). The GAN or other machine learning system may conceptually determine a set of layers based on the first image, each layer corresponding to a structural characteristic or a style characteristic of the first image. For example, a GAN may be provided with a layer value that indicates at least a portion of the style characteristics and does not indicate the structural characteristics to cause the GAN to generate images that retain the structural characteristics of the first image, but modify one or more of the style characteristics of the first image. Other types of machine learning systems may be provided with other types of parameters to cause generated images to retain the structural characteristics of the first image while modifying the style characteristics of the image. For example, each alternate image generated by a GAN or other type of system may include the same objects and background at the same positions within the alternate image as depicted in the first image, but the colors or other characteristics of the pixels in each alternate image may differ from those of the first image.

Using this style-mixing process, the GAN, or another type of machine learning system, may generate any number of images. In one implementation, the machine learning system may be used to generate 50 images, each image having generally identical semantic structure as the first image, but differing style characteristics, such as pixel-wise color correlation across different images. Based on the images generated by the machine learning system, a tensor may be determined, such as by concatenating the color value, or another value for another type of pixel characteristic, at each pixel location. As such, the tensor may, for at least a subset of the pixels in each of the images generated by the machine learning system, associate the location of the pixel with a corresponding color value. A clustering algorithm, such as k-means clustering, may then be used to determine sets of pixels for which changes in color (or other pixel characteristics) occur similarly across the set of images. For example, a first set of pixels associated with a first change in color value across the set of images may represent a first segment, while a second set of pixels associated with a second change in color value across the set of images may represent a second segment. Pixels within the same set may change color similarly across different images, while pixels in different sets may change differently from one another across different images. For example, pixels within the same set may be associated with changes in a color value or other characteristic value that are within a threshold range of the changes associated with other pixels in the set, while pixels in different sets may be associated with changes in values that are outside of the threshold range relative to one another.

In some cases, the machine learning system may be used to generate a first number of images, and a determination may be made regarding the differentiation between regions of pixels across the images. For example, if at least a threshold number of masks are not determined using the techniques described previously, the machine learning system may be used to generate a second number of images that is greater than the first number, and the process may be repeated. However, if masks representing segments within an image are able to be determined using a smaller number of images generated by the machine learning system, this may conserve time and computational resources.

In some cases, multiple machine learning systems may be used to generate images based on an input image. For example, if the accuracy of one or more GANs is not known, use of multiple GANs that are configured to generate images using the same or a similar seed value, may result in a homogenized set of images that reduces the effect of errors or inaccuracies associated with one or more of the GANs.

In some implementations, the techniques described previously may be used to determine segments based on a portion of an image, rather than an entire image. For example, a complex scene such as an image of a room within a structure may include multiple furniture objects having similar colors or other characteristics. In some cases, a machine learning system may modify the colors or other characteristics of these objects in a similar manner when generating alternate images. To prevent different objects from being clustered within the same semantic segment, an object recognition system may be used to determine objects that are present within the first image. A region that includes an object, such as a bounding box, may be determined, and the machine learning system may be used to generate alternate images based on the determined region. Changes in characteristics of pixels across the generated images may then be used to identify a set of pixels in the region of the image that corresponds to the object and one or more sets of pixels that do not correspond to the object (e.g., a background or other object). This process may be repeated to determine multiple regions in the image that include an object, and respective mask data for each region. Individual identification of objects in this manner may enable masks to be generated that allow for removal, replacement, or modification of individual objects within the image.

Implementations described herein may therefore enable mask data to be determined for an image using less computational resources than conventional methods, and that do not require supervised training or use of annotated training data. The techniques described herein may be used with any type of GAN or other machine learning system that is configured to generate images based on an input image, without requiring training or additional training data. For example, the changes in pixels across multiple images that are used to determine a mask may be determined using the same techniques, independent of the type of machine learning system that was used to generate the images.

FIG. 1 is a diagram 100 depicting an implementation of a system for determining mask data 102 that represents locations of objects 104 or a background 106 depicted in an input image 108. As described previously, an image generation module 110, which in some implementations may include a GAN or another type of machine learning system, may be used to determine a set of generated images 112 based on the input image 108. Changes in pixel characteristics of the generated images 112 may then be used to determine the mask data 102.

In some implementations, the input image 108 may be received from a separate computing device. For example, a user accessing the system may provide the input image 108 for generation of mask data 102, such that the input image 108 may be analyzed or edited using the mask data 102. In other implementations, the input image 108 may be stored in association with the system (e.g., in a computing device or data storage accessible to the image generation module 110), and may be selected based on user input. In still other implementations, the input image 108 may be stored in association with the system or with a separate computing device, and the system may be configured to automatically access the input image 108 for generation of mask data 102. For example, the input image 108 may include an image depicting one or more items available for purchase using a website, and mask data 102 may be generated to enable the input image 108 to be modified by users of the website.

The example input image 108 shown in FIG. 1 includes a first object 104(1), a second object 104(2), a third object 104(3), and a fourth object 104(4). The second object 104(2) is depicted as human, while the first object 104(1), third object 104(3), and fourth object 104(4) are depicted as articles of clothing worn by the human. The input image 108 also includes a background 106. The input image 108 may include structural (e.g., semantic) characteristics, such as the shapes and locations of the objects 104 within the input image 108. The input image 108 may also include style characteristics, such as the color or other visual characteristics of pixels in the image (e.g., luminance, brightness, chrominance).

The image generation module 110 may be configured to determine a set of generated images 112 based on the input image 108 by modifying various characteristics of the input image 108 in a random or pseudo-random manner. For example, a seed value 114 provided to the image generation module 110 may at least partially determine the characteristics of the input image 108 that are modified to determine the generated images 112. In some implementations, the image generation module 110 may determine layers associated with the input image 108, each layer representing a particular structural characteristic or style characteristic of the input image 108. For example, a GAN may be configured to determine the layers associated with an input image 108 using a mapping network, while a synthesis network of the GAN is used to determine generated images 112 by modifying one or more layers based in part on the seed value 114. In some implementations, the image generation module 110 may be provided with image generation parameters 116 that cause generated images 112 to be determined using the image generation module 110 to retain the structural characteristics of the input image 108 while modifying one or more style characteristics of the input image 108. For example, when using a GAN to determine the generated images 112, an image generation parameter 116 may include a layer value that indicates the style characteristics of the input image 108 and does not indicate the structural characteristics.

FIG. 1 depicts a set of generated images 112 that include each of the objects 104 and the background 106 depicted in the input image 108, at corresponding locations and having the same shapes. However, each generated image 112 is shown having different pixel characteristics. For example, each pixel of the first object 104(1) is associated with a different color in each of the generated images 112. Similarly, each pixel of the second object 104(2), third object 104(3), fourth object 104(4), and background 106 are associated with respective different colors in each of the generated images 112. While FIG. 1 depicts an example set of five generated images 112, the image generation module 110 may generate any number of images. In one implementation, the image generation module 110 may determine fifty generated images 112. In some implementations, the image generation module 110 may determine a first count of generated images 112, and if a differentiation in pixel characteristics or a count of segments determined based on the generated images 112 is less than a threshold value, the image generation module 110 may determine a second count of generated images 112 that is greater than the first count, and the second count of generated images 112 may be used to determine the mask data 102. Additionally, while FIG. 1 depicts a single image generation module 110, in other implementations, multiple image generation modules 110 may be used to determine the generated images 112. For example, if the accuracy of a particular image generation module 110 is unknown, use of multiple image generation modules 110 may reduce the effect of an error or inaccuracy associated with a particular image generation module 110.

An image analysis module 118 may determine characteristics data 120 based on the generated images 112. In some implementations, the characteristics data 120 may include a tensor or another set of values that is determined by concatenating the pixel characteristics of the generated images 112 at pixel locations for at least a portion of the pixels in the generated images 112. For example, the characteristics data 120 may associate a pixel identifier 122(1) for a first pixel of the generated images 112 with a set of color values 124, each color value 124 indicating the color of the pixel (e.g., an RGB or LAB color space value). The pixel identifier 122(1) may include any type of data that may be used to differentiate a particular pixel from other pixels in the generated images 112. In some implementations, the pixel identifier 122(1) may indicate the location of a pixel within the generated images 112, such as a coordinate value indicating the horizontal and vertical position of the pixel. The first pixel identifier 122(1) may be associated with a first color value 124(1) representing the color of a first pixel in a first generated image 112, a second color value 124(2) representing the color of the first pixel in a second generated image 112, and any number of additional color values 124(X), each color value 124 representing the color of the first pixel in a respective generated image 112. Similarly, FIG. 1 depicts the characteristics data 120 associating a second pixel identifier 122(2) that represents a second pixel in the generated images 112 with a third color value 124(3) representing the color of the second pixel in a first generated image 112, a fourth color value 124(4) representing the color of the second pixel in a second generated image 112, and any number of additional color values 124(Y), each color value 124 representing the color of the second pixel in a respective generated image 112. Any number of additional pixel identifiers 122(N) representing each pixel or a subset of the pixels in the generated images 112, may be associated with corresponding color values 124(A) representing colors of the pixels in the first generated image 112, color values 124(B) representing colors of the pixels in the second generated image 112, and any number of additional color values 124(Z) representing respective colors of the pixels in each generated image 112.

A clustering module 126 may determine mask data 102 based on the characteristics data 120. In some implementations, the characteristics data 120 may include a tensor, and the clustering module 126 may use k-means clustering across the pixels of the generated images 112. The clustering module 126 may determine sets of pixels where, within the set of pixels, the pixels change color similarly across the generated images 112, while compared to other pixels outside of the set, the pixels change color differently. As such, a first set of pixels that changes color similarly across the generated images 112 may be associated with a first mask that represents a first object 104 or background 106, while a second set of pixels that changes color similarly across the generated images 112 may be associated with a second mask that represents a second object 104 or background. FIG. 1 depicts the mask data 102 associating a first mask identifier 128(1) with a first set of pixel identifiers 130(1). A mask identifier 128 may include any type of data that may be used to differentiate a particular mask from other masks. A set of pixel identifiers 130 may include any number of individual pixel identifiers 122 that are associated with a similar change in color across the generated images 112 and are therefore likely to be associated with the same object 104 or background 106 depicted in the input image 108. The mask data 102 also associates a second mask identifier 128(2) with a second set of pixel identifiers 130(2), and any number of additional mask identifiers 128(K) with corresponding sets of pixel identifiers 130(K). Any number of mask identifiers 128 and corresponding sets of pixel identifiers 130 may be determined based on the number of sets of pixels associated with similar changes in color determined using the clustering module 126.

Mask data 102 may be stored in association with the input image 108 and used in subsequent image analysis or image editing processes. For example, mask data 102 may be used to determine the locations of objects 104 and a background 106 within the input image 108, which may facilitate object recognition. As another example, mask data 102 may be used to remove, replace, or modify portions of the input image 108, such as by removing or replacing a particular object 104 without affecting pixels associated with other objects 104 depicted in the input image 108.

Figure 2A:
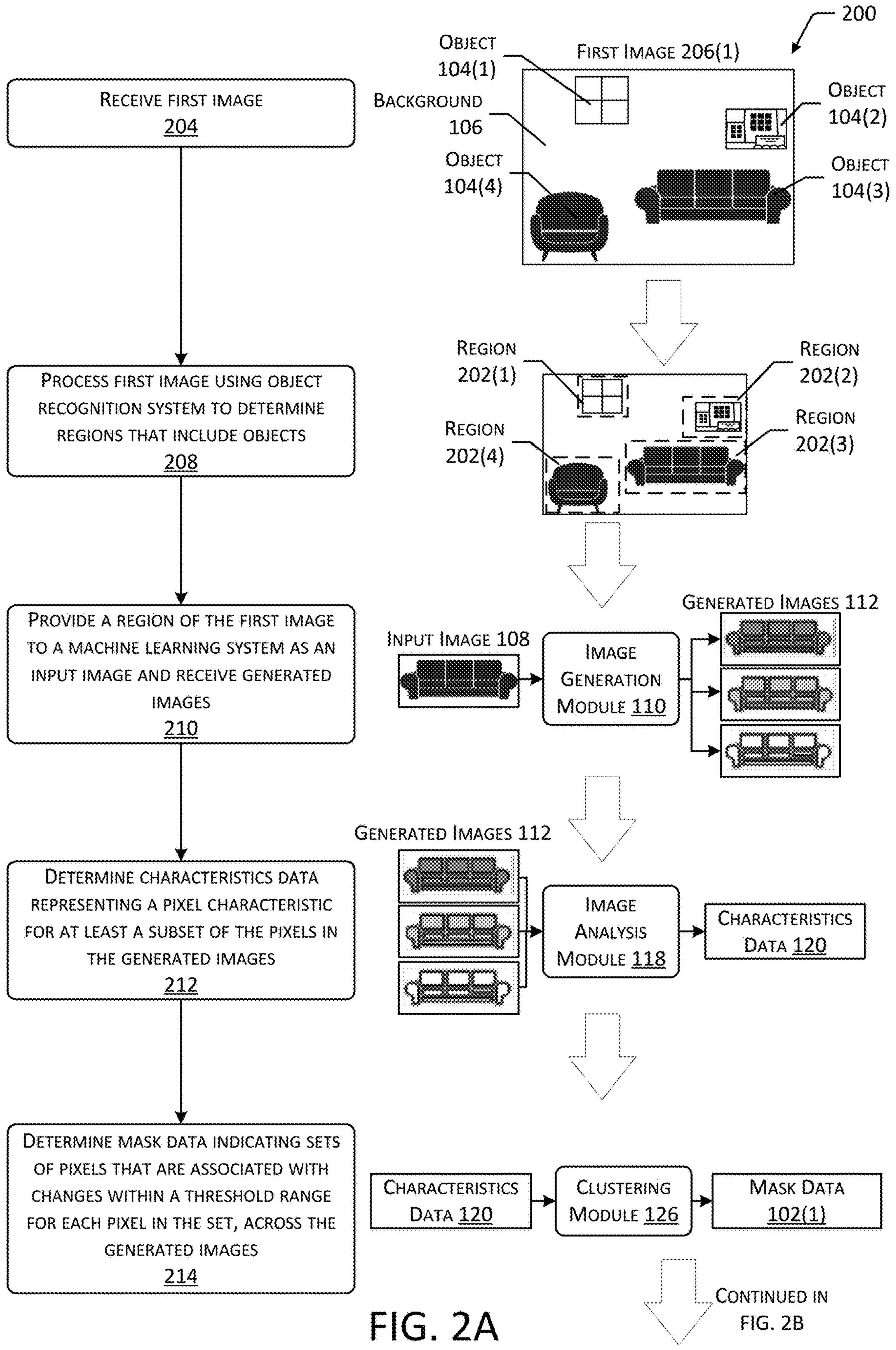
FIGS. 2A and 2B are a diagram depicting an implementation of a process for determining mask data representing locations of objects in different regions of an initial image and generating a modified image using the mask data.
Figure 2B:
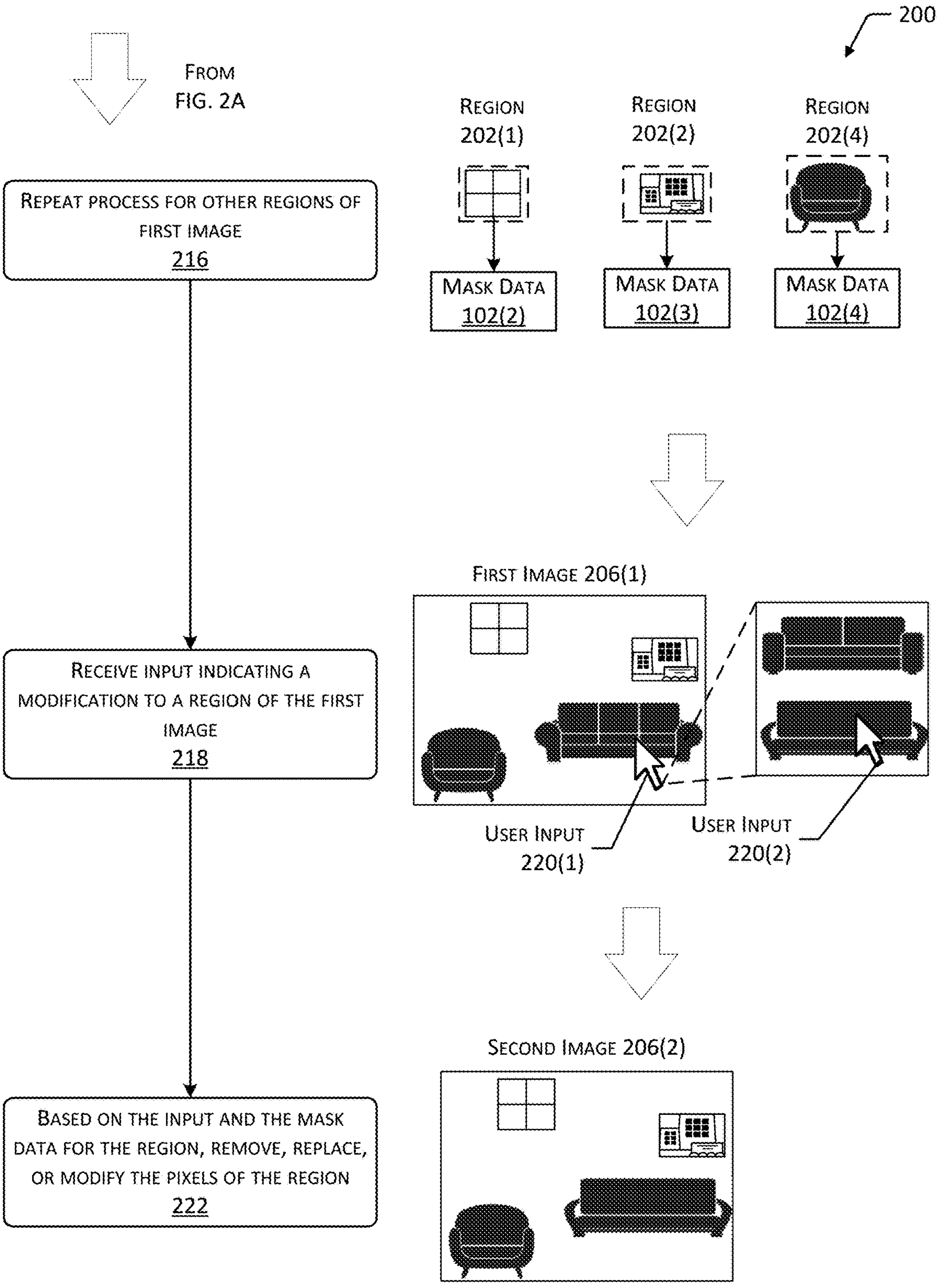

FIGS. 2A and 2B are a diagram 200 depicting an implementation of a process for determining mask data 102 representing locations of objects 104 in different regions 202 of an initial image and generating a modified image using the mask data 102. As shown in FIG. 2A, at 204, a first image 206(1) may be received. As described with regard to FIG. 1, in some implementations, the first image 206(1) may be provided from a separate computing device to a system associated with an image generation module 110. In other implementations, the first image 206(1) may be stored in association with the system associated with the image generation module 110. FIG. 2 depicts an example first image 206(1) that includes multiple furniture and decorative objects within a room. For example, a first object 104(1) is shown as a window of the room, a second object 104(2) as a picture positioned on a wall of the room, a third object 104(3) as a sofa, and a fourth object 104(4) as a chair. The first image 206(1) may include structural (e.g., semantic) characteristics, such as the shapes and locations of the objects 104, and style characteristics, such as the color or other visual characteristics of pixels in the image (e.g., luminance, brightness, chrominance).

At 208, the first image 206(1) may be processed using an object recognition system that may determine regions 202 of the first image 206(1) that include objects 104. For example, an object recognition system may be trained to identify the presence of various types of objects within images. The object recognition system may determine specific regions of the first image 206(1), such as bounding boxes, that include objects 104 determined using the object recognition system. For example, FIG. 2 depicts a first region 202(1) that includes the first object 104(1), a second region 202(2) that includes the second object 104(2), a third region 202(3) that includes the third object 104(3), and a fourth region 202(4) that includes the fourth object 104(4). In some cases, use of a GAN or other type of machine learning system to generate alternate images based on a complex or cluttered image may result in multiple objects 104 being classified within the same semantic segment, especially in cases where multiple objects 104 have similar visual characteristics. For example, an image depicting a room within a structure having furniture or decorative objects that are matching or coordinated may include objects 104 with similar visual characteristics. Use of individual regions 202 of the first image 206(1) as input images 108 may increase the accuracy of segments that are determined when using the image generation module 110 to determine generated images 112 based on the regions 202, rather than based on the entire first image 206(1).

At 210, a region 202 of the first image 206(1) may be provided to a machine learning system as an input image 108, and generated images 112 may be received from the machine learning system. For example, FIG. 2A depicts the third region 202(3) of the first image 206(1), which includes the third object 104(3) and a portion of the background 106, provided to the image generation module 110, which may determine multiple generated images 112. As described with regard to FIG. 1, the image generation module 110 may be configured, such as through use of a seed value 114 and image generation parameters 116, to determine generated images 112 by modifying visual characteristics of the pixels of the input image 108 (e.g., style characteristics), while retaining the structural (e.g., semantic) characteristics of the input image 108, such as the shapes and locations of the object 104(3) within the input image 108. For example, each generated image 112 may depict the object 104(3) and the portion of the background 106 having pixels of different colors, or other visual characteristics.

At 212, characteristics data 120 may be determined based on the generated images 112. The characteristics data 120 may represent a pixel characteristic for at least a subset of the pixels in the generated images 112. For example, as described with regard to FIG. 1, the characteristics data 120 may include a tensor or other data structure that associates pixel identifiers 122, such as the locations of pixels within the generated images 112, with corresponding color values 124 or other values indicative of a pixel characteristic. Continuing the example, an image analysis module 118 may generate characteristics data 120 that associates a pixel identifier 122 for a particular pixel with a respective color value 124 or other value representing the characteristic of the pixel for each generated image 112. In other implementations, a pixel may be associated with a respective color value 124 or other value for a subset of the generated images 112. For example, if a color value 124 or other value for a pixel characteristic is unable to be determined within a threshold confidence, or if mask data 102 is able to be generated using only a subset of the generated images 112, use of every generated image 112 may be omitted.

At 214, mask data 102(1) that indicates sets of pixels associated with changes in pixel characteristics for each pixel in the set, that are within a threshold range across the generated images 112, may be determined. For example, k-means clustering or another type of clustering algorithm may be used to determine sets of pixels where, within the set of pixels, the pixels change in color or another characteristic similarly across the generated images 112, while compared to other pixels outside of the set, the pixels change differently. Continuing the example, a first set of pixels that changes color similarly across the generated images 112 may be associated with a first mask that represents the object 104(3) depicted in the input image 108. A second set of pixels that changes color similarly across the generated images 112 may represent a portion of the background 106 depicted in the input image 108. Mask data 102(1) that represents any number of sets of pixels associated with similar changes in color or another characteristic may be determined using a clustering module 126.

As shown in FIG. 2B, at 216, the process described at 210, 212, and 214 may be repeated for other regions 202 of the first image 206(1). For example, the first region 202(1) that depicts the first object 104(1) may be used as an input image 108, and mask data 102(2) indicating sets of pixels that represent the location of the first object 104(1) and a portion of the background 106 in the first region 202(1) may be determined. The second region 202(2) that depicts the second object 104(2) may be used as an input image 108, and mask data 102(3) indicating sets of pixels that represent the location of the second object 104(2) and a portion of the background 106 in the second region 202(2) may also be determined. Similarly, the fourth region 202(4) that depicts the fourth object 104(4) may be use as an input image 108, and mask data 102(4) indicating sets of pixels that represent the location of the fourth object 104(4) and a portion of the background 106 in the fourth region 202(4) may be determined.

In some implementations, additional processing, such as a foreground identification process, may be performed, based on the mask data 102 for the first image 206(1). For example, determination of mask data 102 may not indicate the pixels within an image that are likely to be of interest to a user. A foreground identification process may be used to determine which sets of pixels indicated in the mask data 102 correspond to objects 104, and which sets of pixels correspond to a background 106. In some implementations, a corner minority approach may be used to determine foreground and background pixels. For example, for a given region 202, the corner minority approach may assume that an object 104 is located at the approximate center of the region 202, while the corners of the region 202 primarily include background pixels. Sets of pixels indicated in the mask data 102 having pixel characteristics that correspond to the pixels located in the corners of the region 202, within a threshold, may be classified as segments associated with the background 106, while other sets of pixels indicated in the mask data 102 may be classified as segments associated with a foreground object 104. In some cases, other characteristics such as a size or portion of a frame occupied by a set of pixels, color diversity of pixels, the presence or absence of particular colors, and so forth may be used to determine foreground objects 104. In other implementations, a saliency approach may be used to determine foreground pixels, in which a saliency map is used to approximate a probability for each pixel to belong to a foreground in a region 202. A pre-defined Gaussian heat map peaked at the center of an image may be used as the saliency map. Where Y is a given mask, and given a predefined threshold @saliency and cluster index m ∈{1, . . . , k}, foreground clusters may be identified by examining the average saliency for all pixels within the cluster m. Specifically, cluster m is a foreground cluster if Equation 1, below, is true.

$$(1/N)\sum S(i, j) > \theta_{saliency}, \text{ for all } i, j \in \{Y = m\} \quad \text{(EQUATION 1)}$$

At 218, input may be received indicating a modification to a region 202 of the first image 206(1). For example, one possible use of the mask data 102 may include permitting portions of the first image 206(1) that corresponds to a particular object 104 or background 106 to be removed, replaced, or modified, such as by changing a color or pattern associated with an object 104 or background 106, removing an object 104, or replacing an object 104 or background 106 with an alternate object 104 or background 106, without affecting pixels associated with other objects 104. Continuing the example, FIG. 2B depicts first user input 220(1) selecting a region 202(3) of the first image 206(1) that corresponds to the third object 104(3), and second user input 220(2) selecting an alternate object to be depicted in place of the third object 104(3).

At 222, based on the input and the mask data 102 for the region 202, one or more pixels associated with the region 202 may be modified. For example, a second image 206(2) may be generated that replaces the third object 104(3) with an alternate object 104, without affecting the pixels associated with other objects 104 depicted in the image. As a result, the mask data 102 may allow objects 104 to be selectively removed, replaced, or modified, such as when a user is accessing a website associated with the purchase or lease of objects 104.

Figure 3:
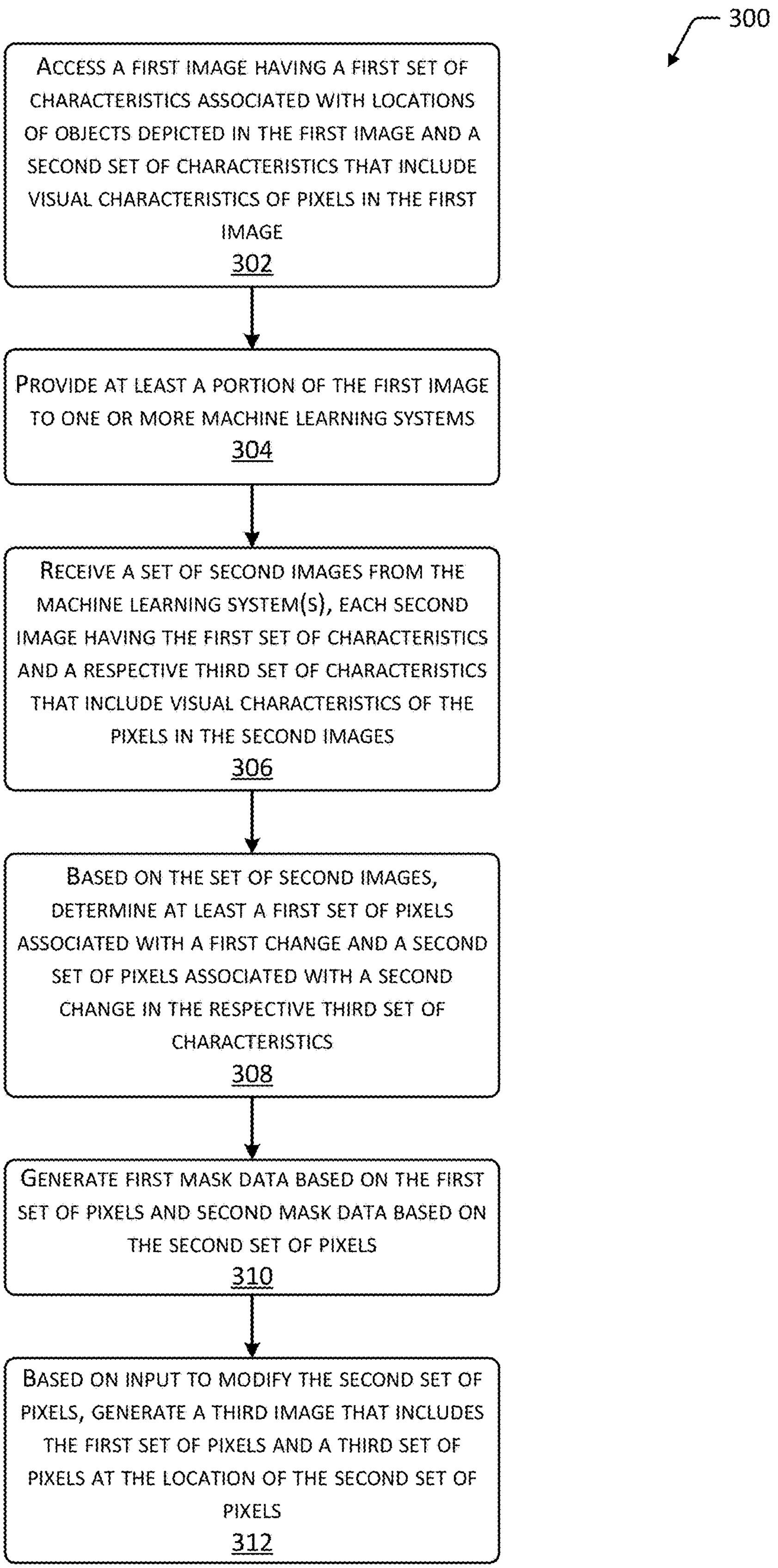
FIG. 3 is a flow diagram depicting an implementation of a method for determining mask data that represents locations of objects or a background within an initial image, and receiving input to generate a modified image using the mask data.

FIG. 3 is a flow diagram 300 depicting an implementation of a method for determining mask data 102 that represents locations of objects 104 or a background 106 within an initial image, and receiving input to generate a modified image using the mask data 102. At 302, a first image 206(1) may be accessed. The first image 206(1) may have a first set of characteristics associated with locations of objects 104 depicted in the first image 206(1) and a second set of characteristics that include visual characteristics of pixels in the first image 206(1). For example, the first set of characteristics may include the shapes and locations of objects 104 depicted in the image, while the second set of characteristics may include colors of pixels in the image.

At 304, at least a portion of the first image 206(1) may be provided to one or more machine learning systems. As described previously, in some implementations, the machine learning system(s) may include a GAN. In some cases, multiple machine learning systems may be used, while in other cases, a single machine learning system may be used. As described with regard to FIGS. 2A and 2B, in some implementations, an object recognition system may be used to determine one or more regions 202 of the first image 206(1) that include objects 104, and a portion of the first image 206(1) that corresponds to a particular region 202 may be provided to the machine learning system. In other implementations, the entire first image 206(1) may be provided to the machine learning system.

At 306, a set of second images (e.g., generated images 112) may be received from the machine learning system(s), each second image having the first set of characteristics and a respective third set of characteristics that include visual characteristics of the pixels in the second images. The respective third sets of characteristics may differ from the second set of characteristics associated with the first image 206(1). For example, a generated image 112 determined by the machine learning system(s) may retain the shapes and locations of the objects 104 depicted in the first image 206(1), but may modify the color or other visual characteristics of one or more pixels that are presented in the generated images 112 relative to the first image 206(1).

At 308, based on the second set of images, at least a first set of pixels associated with a first change and a second set of pixels associated with a second change in the respective third set of characteristics may be determined. As described previously, sets of pixels that change in a similar manner across the generated images 112 may be determined to be part of the same semantic segment, while pixels that change differently relative to one another may be part of different segments. In some implementations, characteristics data 120, such as a tensor or other data structure, may be determined by concatenating the pixel characteristics of the generated images 112 at pixel locations for at least a portion of the pixels in the generated images 112. For example, the characteristics data 120 may associate a pixel identifier 122 for at least a subset of pixels in the generated images 112 with corresponding color values 124, or other values indicative of a pixel characteristic, for at least a subset of the generated images 112. K-means clustering or another type of clustering algorithm may be used to determine sets of pixels where, within the set of pixels, the pixels change color similarly across the generated images 112, while compared to other pixels outside of the set, the pixels change color differently.

At 310, first mask data 102 may be generated based on the first set of pixels and second mask data 102 may be generated based on the second set of pixels. The mask data 102 may associate mask identifiers 128 that represent particular masks, semantic segments, objects 104, or backgrounds 106, with corresponding sets of pixel identifiers 130 that represent the pixels included in a semantic segment of the first image 206(1). The mask data 102 may be used to modify pixels associated with a particular object 104 or background 106 without modifying pixels associated with different objects 104.

At 312, based on input to modify the second set of pixels, a third image may be generated that includes the first set of pixels and a third set of pixels at the location of the second set of pixels. For example, as described with regard to FIG. 2B, input indicative of a particular region 202 or object 104 within an image may be used to indicate removal, replacement, or modification of the pixels associated with the region 202 or object 104. The third set of pixels may therefore represent a portion of the image with an object 104 removed (e.g., pixels representing a background 106 may be shown in place of the object 104), an alternate object 104 depicted in place of the initial object 104, or a characteristic of the object 104 changed, such as a color or pattern.

Figure 4:
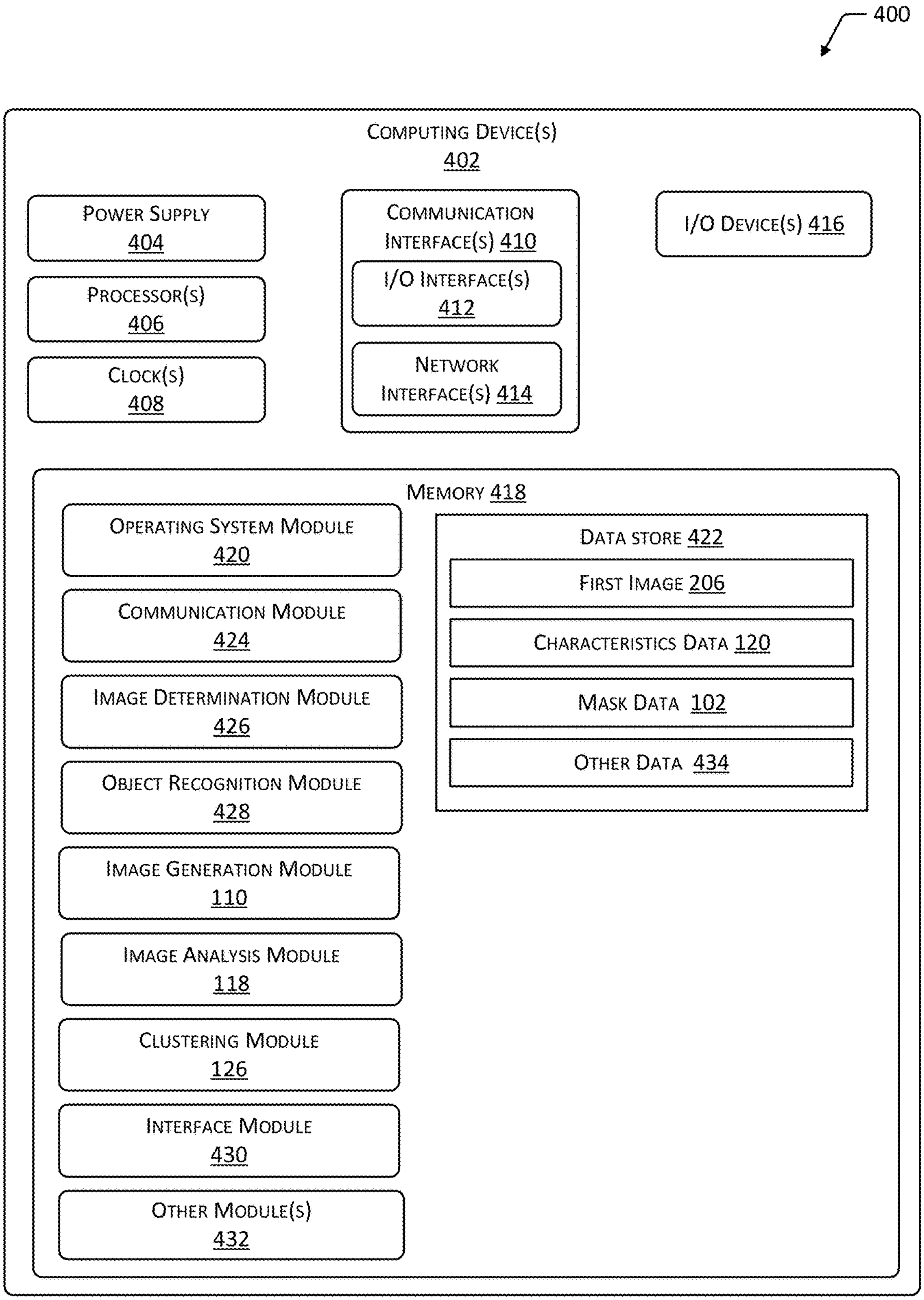
FIG. 4 is a block diagram depicting an implementation of a computing device within the present disclosure.

FIG. 4 is a block diagram 400 depicting an implementation of a computing device 402 within the present disclosure. The computing device 402 may be used to store and control operations of the system 100 shown in FIG. 1, and to perform the operations described with regard to FIGS. 2A, 2B, and 3. While a single block diagram 400 is depicted, in some implementations, the computing device 402 may include multiple computing devices. For example, one or more servers may store the modules and data described with regard to FIGS. 1, 2A, 2B, and 3, and may be accessed using one or more other computing devices. In other implementations, one or more other types of computing devices 402, such as personal computing devices, portable computing devices, network-accessible data storage devices, and so forth may be used. In some implementations, the same computing device 402 or group of computing devices 402 may store an input image 108, perform object recognition, determine generated images 112 using a machine learning system, determine characteristics data 120 based on the generated images 112, and determine mask data 102 based on the characteristics data 120. In other implementations, different computing devices 402 or groups of computing devices 402 may perform various functions described herein. For example, an input image 108 may be received from an external computing device, a machine learning system may operate on one or more separate computing devices from other components of the system 100, and so forth.

One or more power supplies 404 may be configured to provide electrical power suitable for operating the components of the computing device 402. In some implementations, the power supply 404 may include a rechargeable battery, fuel cell, photovoltaic cell, power conditioning circuitry, and so forth.

The computing device 402 may include one or more hardware processor(s) 406 (processors) configured to execute one or more stored instructions. The processor(s) 406 may include one or more cores. One or more clock(s) 408 may provide information indicative of date, time, ticks, and so forth. For example, the processor(s) 406 may use data from the clock 408 to generate a timestamp, trigger a preprogrammed action, and so forth.

The computing device 402 may include one or more communication interfaces 410, such as input/output (I/O) interfaces 412, network interfaces 414, and so forth. The communication interfaces 410 may enable the computing device 402, or components of the computing device 402, to communicate with other computing devices 402 or components of the other computing devices 402. The I/O interfaces 412 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 412 may couple to one or more I/O devices 416. The I/O devices 416 may include any manner of input devices or output devices associated with the computing device 402. For example, I/O devices 416 may include touch sensors, displays, touch sensors integrated with displays (e.g., touchscreen displays), keyboards, mouse devices, microphones, image sensors, cameras, scanners, speakers or other types of audio output devices, haptic devices, printers, and so forth. In some implementations, the I/O devices 416 may be physically incorporated with the computing device 402. In other implementations, I/O devices 416 may be externally placed.

The network interfaces 414 may be configured to provide communications between the computing device 402 and other devices, such as the I/O devices 416, routers, access points, and so forth. The network interfaces 414 may include devices configured to couple to one or more networks including local area networks (LANs), wireless LANs (WLANs), wide area networks (WANs), wireless WANs, and so forth. For example, the network interfaces 414 may include devices compatible with Ethernet, Wi-Fi, Bluetooth, ZigBee, Z-Wave, 5G, LTE, and so forth.

The computing device 402 may include one or more buses or other internal communications hardware or software that allows for the transfer of data between the various modules and components of the computing device 402.

As shown in FIG. 4, the computing device 402 may include one or more memories 418. The memory 418 may include one or more computer-readable storage media (CRSM). The CRSM may be any one or more of an electronic storage medium, a magnetic storage medium, an optical storage medium, a quantum storage medium, a mechanical computer storage medium, and so forth. The memory 418 may provide storage of computer-readable instructions, data structures, program modules, and other data for the operation of the computing device 402. A few example modules are shown stored in the memory 418, although the same functionality may alternatively be implemented in hardware, firmware, or as a system on a chip (SoC).

The memory 418 may include one or more operating system (OS) modules 420. The OS module 420 may be configured to manage hardware resource devices such as the I/O interfaces 412, the network interfaces 414, the I/O devices 416, and to provide various services to applications or modules executing on the processors 406. The OS module 420 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Washington, USA; or other operating systems.

One or more data stores 422 and one or more of the following modules may also be associated with the memory 418. The modules may be executed as foreground applications, background tasks, daemons, and so forth. The data store(s) 422 may use a flat file, database, linked list, tree, executable code, script, or other data structure to store information. In some implementations, the data store(s) 422 or a portion of the data store(s) 422 may be distributed across one or more other devices including other computing devices 402, network attached storage devices, and so forth.

A communication module 424 may be configured to establish communications with one or more other computing devices 402. Communications may be authenticated, encrypted, and so forth.

The memory 418 may additionally store an image determination module 426. In some implementations, the image determination module 426 may receive images from external sources, such as images provided by users or administrators for analysis and generation of mask data 102. In other implementations, the image determination module 426 may access images stored in the data store 422, or obtain images from other computing devices or data storage, for generation of mask data 102 associated with the accessed images. For example, the image determination module 426 may be configured to automatically generate mask data 102 for images associated with a website or other collection of interfaces.

The memory 418 may also store an object recognition module 428. The object recognition module 428 may be trained to determine regions 202 of an image that include one or more types of objects 104. For example, the object recognition module 428 may include one or more image recognition systems, object detectors, zero-shot object detectors, and so forth. Use of an object recognition module 428 to determine regions 202 of an image that include objects 104 may be useful for complex or cluttered images where a foreground or object 104 of interest may not be defined by a type of object or its appearance and alignment. Additionally, use of an object recognition module 428 may prevent classification of multiple objects 104 within the same semantic segment, such as if two objects 104 in an image have a similar color or other visual characteristic.

The memory 418 may store the image generation module 110. The image generation module 110 may be configured to determine a set of generated images 112 based on an input image 108 by modifying various characteristics of the input image 108 in a random or pseudo-random manner. In some implementations, one or more of a seed value 114 or a layer value 116 may be used to at least partially control the characteristics of the input image 108 that are modified and the type of modifications that are used to determine the generated images 112. In some implementations, the image generation module 110 may include a GAN or other type of machine learning system, such as a neural network, deep learning network, convolutional network, transformer network, and so forth. Additionally, in some implementations, multiple machine learning systems may be used to determine generated images 112.

The memory 418 may additionally store the image analysis module 118. The image analysis module 118 may determine characteristics data 120 based on a set of generated images 112. Characteristics data 120 may associate identifiers, such as pixel locations, for at least a subset of the pixels in the generated images 112, with corresponding values indicative of the values of a pixel characteristic across at least a subset of the generated images 112, such as a color value 124. In some implementations, the characteristics data 120 may include a tensor.

The memory 418 may also store the clustering module 126. The clustering module 126 may determine mask data 102 based on the characteristics data 120, or in some implementations, based on the generated images 112. In some implementations, the clustering module 126 may use k-means clustering across the pixels of the generated images 112 to determine where, within the set of pixels, the pixels change in color or another characteristic similarly across the generated images 112, while compared to other pixels outside of the set, the pixels change color differently. The mask data may associate a mask identifier 128 that represents a particular mask, region 202, or object 104 with a corresponding set of pixels that may represent an object 104 or background 106 within the input image 108.

The memory 418 may store an interface module 430. The interface module 430 may generate user interfaces that include images or other data for presentation on one or more computing devices 402. For example, the interface module 430 may present an image for which mask data 102 was generated and receive user input 220 indicating one or more modifications to the image. Based on the mask data 102, the interface module 430 may determine an alternate image based on the modifications indicated in the user input 220, such as by removing, replacing, or modifying one or more objects 104 or a background 106 associated with the presented image.

Other modules 432 may also be present in the memory 418. For example, other modules 432 may include training modules to train the object recognition module 428, image generation module 110, clustering module 126, and so forth. Other modules 432 may include permission or authorization modules for modifying data associated with the computing device 402, such as threshold values, configurations or settings, training data, and so forth. Other modules 432 may also include encryption modules to encrypt and decrypt communications between computing devices 402, authentication modules to authenticate communications sent or received by computing devices 402, and so forth. Other modules 432 may additionally include modules for performing foreground identification processes to determine, based on mask data 102, the pixels within an image that are likely to be associated with foreground objects 104 or backgrounds within the image.

Other data 434 within the data store(s) 422 may include configurations, settings, preferences, and default or threshold values associated with computing devices 402, training data associated with machine learning modules, interface data for generation of user interfaces, and so forth. Other data 434 may also include encryption keys and schema, access credentials, and so forth.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
- one or more non-transitory memories storing computer-executable instructions; and
- one or more hardware processors to execute the computer-executable instructions to:
  - access a first image having a first set of structural characteristics and a first set of style characteristics, wherein the first set of structural characteristics is associated with one or more of locations or shapes of objects depicted within the first image, and wherein the first set of style characteristics is associated with colors of pixels within the first image;
  - provide the first image to a Generative Adversarial Network (GAN) that is trained to generate images having alternate style characteristics based on input images;
  - receive, from the GAN, a plurality of second images, wherein each second image of the plurality of second images includes:
  - the first set of structural characteristics; and
  - a respective second set of style characteristics having at least one first style characteristic that differs from the first set of style characteristics, wherein each respective set of style characteristics further includes at least one second style characteristic that differs from at least one other respective set of style characteristics;
  - determine based on at least a subset of pixels of the plurality of second images, a tensor, wherein the tensor associates a location of a pixel within a respective image with a respective color value of the pixel for each second image of the plurality of second images;
  - use a clustering algorithm to determine, based on the tensor, a first set of pixels associated with a first set of changes in color values that occur within at least a threshold portion of images included in the plurality of second images;
  - use the clustering algorithm to determine, based on the tensor, a second set of pixels associated with a second set of changes in color values that occur within the at least a threshold portion of images included in the plurality of second images;
  - generate, based on the first set of pixels being associated with the first set of changes in color values, first mask data associated with the first image; and
  - generate, based on the second set of pixels being associated with the second set of changes in color values, second mask data associated with the first image.

2. The system of claim 1, further comprising computer-executable instructions to:
- receive input indicating a modification associated with the first set of pixels of the first image; and
- based on the first mask data, generate a third image by applying a characteristic based on the modification to the first set of pixels of the first image, wherein the third image includes the second set of pixels of the first image.

3. The system of claim 1, wherein the GAN determines a plurality of layers associated with the first image, and wherein each layer of the plurality of layers is associated with one of a structural characteristic of the first set of structural characteristics or a style characteristic of the first set of style characteristics, the system further comprising computer-executable instructions to:
- determine a layer value that indicates at least a portion of the first set of style characteristics and that does not indicate the first set of structural characteristics; and
- provide the layer value to the GAN to cause the GAN to generate images having alternate style characteristics that retain the first set of structural characteristics.

4. A system comprising:
- one or more non-transitory memories storing computer-executable instructions; and
- one or more hardware processors to execute the computer-executable instructions to:
  - provide a first image to a machine learning system that is trained to generate images having alternate characteristics based on input images, wherein the first image includes a first set of characteristics associated with one or more of locations or shapes of objects depicted within the first image and a second set of characteristics;
  - receive, from the machine learning system, a plurality of second images, each second image having the first set of characteristics and a respective third set of characteristics that differs from the second set of characteristics and differs from at least one third set of characteristics of at least one other second image of the plurality of second images;
  - determine, based on the plurality of second images, at least a first set of pixels associated with a first set of changes in the respective third set of characteristics, wherein the first set of changes occurs within at least a threshold portion of images included in the plurality of second images, and a second set of pixels associated with a second set of changes in the respective third set of characteristics, wherein the second set of changes occurs within the at least a threshold portion of images included in the plurality of second images;

generate, based on the first set of pixels being associated with the first set of changes, first mask data associated with the first image; and generate, based on the second set of pixels being associated with the second set of changes, second mask data associated with the first image.

5. The system of claim 4, further comprising computer-executable instructions to:

based on the second mask data, generate a third image by modifying the second set of pixels to form a third set of pixels and including the first set of pixels and the third set of pixels in the third image.

6. The system of claim 4, wherein the second set of characteristics include a visual characteristic of at least a subset of pixels in the first image.

7. The system of claim 6, wherein the second set of characteristics comprises a respective color value for each pixel of the at least a subset of the pixels.

8. The system of claim 4, wherein the machine learning system comprises a Generative Adversarial Network (GAN), wherein the GAN determines a plurality of layers associated with the first image, and wherein each layer of the plurality of layers is associated with one of: a first characteristic of the first set or a second characteristic of the second set, the system further comprising computer-executable instructions to:

determine a layer value that indicates the second set of characteristics and that does not indicate the first set of characteristics; and provide the layer value to the GAN to cause the GAN to generate images that retain the first set of characteristics.

9. The system of claim 4, further comprising computer-executable instructions to:

determine, using a clustering algorithm and based on the respective third sets of characteristics, that the first set of pixels associated with the first set of changes is associated with changes in the respective third sets of characteristics across the plurality of second images that are within a threshold range; and determine, using the clustering algorithm and based on the respective third sets of characteristics, that the second set of pixels associated with the second set of changes is associated with changes in the respective third sets of characteristics across the plurality of second images that are within the threshold range;

wherein the first set of pixels and the second set of pixels are determined based on output from the clustering algorithm.

10. The system of claim 4, further comprising computer-executable instructions to:

determine, based on at least a subset of pixels of the plurality of second images, a tensor that associates a location of each pixel of the at least a subset of pixels with a corresponding value associated with the respective third set of characteristics for each second image of the plurality of second images;

determine, based on the tensor and a clustering algorithm, that the first set of pixels is associated with changes in the corresponding values that are within a threshold range;

determine, based on the tensor and the clustering algorithm, that the second set of pixels is associated with changes in the corresponding values that are within the threshold range; and wherein the first set of pixels and the second set of pixels are determined based on output from the clustering algorithm.

11. The system of claim 4, further comprising computer-executable instructions to:

at a first time, receive a first count of the plurality of second images from the machine learning system;

determine, based on the first count of the plurality of second images, an absence of at least a threshold number of sets of pixels associated with changes within a threshold range; and at a second time, receive a second count of the plurality of second images from the machine learning system, wherein the second count is greater than the first count;

wherein the first set of pixels and the second set of pixels are determined based on the second count of the plurality of second images.

12. The system of claim 4, further comprising computer-executable instructions to:

process the first image using an object recognition system to determine a first region that includes a first object;

wherein the plurality of second images is generated based on the first region of the first image, and one of the first set of pixels or the second set of pixels corresponds to a location of the first object within the first image.

13. A system comprising:

one or more non-transitory memories storing computer-executable instructions; and one or more hardware processors to execute the computer-executable instructions to:

determine a plurality of first images, wherein:

each first image of the plurality of first images has a first set of characteristics, and each first image of the plurality of first images has a respective second set of characteristics that differs from a respective second set of characteristics of at least one other first image of the plurality of first images;

determine, based on at least one region of the plurality of first images, a first set of pixels associated with a first set of changes in the respective second set of characteristics, wherein the first set of changes occurs within at least a threshold portion of images included in the plurality of first images;

determine, based on the at least one region of the plurality of first images, a second set of pixels associated with a second set of changes in the respective second set of characteristics, wherein the second set of changes occurs within at least a threshold portion of images included in the plurality of first images;

generate, based on the first set of pixels being associated with the first set of changes, first mask data associated with at least one first image of the plurality of first images, wherein the first mask data indicates the first set of pixels; and generate, based on the second set of pixels being associated with the second set of changes, second mask data associated with the at least one first image, wherein the second mask data indicates the second set of pixels.

14. The system of claim 13, further comprising computer-executable instructions to provide a second image to a machine learning system, wherein the second image has the first set of characteristics and a third set of characteristics that differs from at least a subset of the respective second sets of characteristics, and wherein the machine learning system is trained to generate images having alternate characteristics based on input images;

wherein the plurality of first images are determined using the machine learning system based on the second image.

15. The system of claim 13, further comprising computer-executable instructions to:

provide a second image to a Generative Adversarial Network (GAN) that is trained to generate images having alternate characteristics based on input images, wherein the second image has the first set of characteristics and a third set of characteristics that differs from at least a subset of the respective second sets of characteristics, wherein the GAN determines a plurality of layers associated with the second image, and wherein each layer of the plurality of layers is associated with one of: a first characteristic of the first set or a third characteristic of the third set;

determine a layer value that indicates the third set of characteristics and that does not indicate the first set of characteristics; and provide the layer value to the GAN to cause the GAN to generate images that retain the first set of characteristics;

wherein the plurality of first images are determined using the GAN based on the second image.

16. The system of claim 13, further comprising computer-executable instructions to:

process a second image using an object recognition system to determine a region of the second image that includes an object; and provide the second image to a machine learning system that is trained to generate images having alternate characteristics based on input images;

wherein the plurality of first images is generated by the machine learning system based on the region of the second image, and wherein one of the first set of pixels or the second set of pixels corresponds to a location of the object within the second image.

17. The system of claim 13, wherein the first set of characteristics corresponds to one or more of a shape or a location of an object within each first image of the plurality of first images, and wherein the respective second set of characteristics correspond to a visual characteristic of at least a subset of pixels within each first image.

18. The system of claim 13, further comprising computer-executable instructions to:

determine, based on at least a subset of pixels of the plurality of first images, a tensor that associates a location of each pixel of the at least a subset of pixels with a corresponding value associated with the respective second set of characteristics for each first image of the plurality of first images;

wherein the first set of pixels and the second set of pixels are determined based in part on the tensor.

19. The system of claim 18, further comprising computer-executable instructions to:

determine, based on the tensor and a clustering algorithm, that the first set of pixels is associated with changes in the corresponding values that are within a threshold range; and determine, based on the tensor and the clustering algorithm, that the second set of pixels is associated with changes in the corresponding values that are within the threshold range;

wherein the first set of pixels and the second set of pixels are determined based on output from the clustering algorithm.

20. The system of claim 13, further comprising computer-executable instructions to:

based on the second mask data, generate a second image by modifying the second set of pixels to form a third set of pixels and including the first set of pixels and the third set of pixels in the second image.

* * * * *